(12) United States Patent
Satoh

(10) Patent No.: US 6,925,574 B2
(45) Date of Patent: Aug. 2, 2005

(54) IMAGE FORMING APPARATUS HAVING AN IMPROVED POWER-MODE SWITCHING FUNCTION

(75) Inventor: Kazuhiro Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 561 days.

(21) Appl. No.: 10/107,919

(22) Filed: Mar. 27, 2002

(65) Prior Publication Data

US 2002/0178389 A1 Nov. 28, 2002

(30) Foreign Application Priority Data

Mar. 29, 2001 (JP) ........................................ 2001-095063

(51) Int. Cl.⁷ ................................................ G06F 1/32
(52) U.S. Cl. .......................... 713/323; 713/300; 713/320
(58) Field of Search ................................ 713/300, 320, 713/323

(56) References Cited

U.S. PATENT DOCUMENTS

| | | | | |
|---|---|---|---|---|
| 5,386,572 A | * | 1/1995 | Takase et al. | 715/531 |
| 5,483,353 A | * | 1/1996 | Kudou | 358/404 |
| 5,825,992 A | * | 10/1998 | Satoh | 358/1.16 |
| 5,920,727 A | * | 7/1999 | Kikinis et al. | 713/323 |
| 5,987,274 A | | 11/1999 | Satoh | |
| 6,639,907 B2 | * | 10/2003 | Neufeld et al. | 370/342 |
| 6,687,382 B2 | * | 2/2004 | Nagahara et al. | 382/100 |
| 6,718,381 B1 | * | 4/2004 | Herzi | 709/224 |
| 6,791,572 B1 | * | 9/2004 | Cloney et al. | 713/1 |

FOREIGN PATENT DOCUMENTS

| | | |
|---|---|---|
| JP | 8130595 | 5/1996 |
| JP | 9307672 | 11/1997 |
| JP | 10173840 | 6/1998 |

\* cited by examiner

*Primary Examiner*—Lynne H. Browne
*Assistant Examiner*—Anand B. Patel
(74) *Attorney, Agent, or Firm*—Cooper & Dunham LLP

(57) ABSTRACT

An image forming device having a communication unit includes a system control unit which controls the entire image forming apparatus, the system control unit having a CPU that is set in one of a normal mode, a power-saving mode and a sleep mode by controlling a power supply unit. A real-time clock keeps track of hours, minutes and seconds of a current time and outputs a signal indicating the current time. A register stores a return time that indicates a time the CPU is to be switched from one of the power-saving mode and the sleep mode to the normal mode. A comparator compares the current time of the clock with the return time of the register, and outputs, when a match occurs, a control signal to the CPU so that the CPU is switched to the normal mode.

15 Claims, 5 Drawing Sheets

IMAGE FORMING APPARATUS HAVING AN IMPROVED POWER-MODE SWITCHING FUNCTION

BACKGROUND OF THE INVENTION

1. Field of the Invention

The present invention relates to an image forming apparatus having a communication function, such as a facsimile machine or a multi-function machine.

2. Description of the Related Art

Conventionally, there are various types of image forming device having a communication function.

Japanese Laid-Open Patent Application No. 8-130595 discloses an image forming device having a communication function, in which operational history data is stored. Changes in the operational state of the image forming device are stored as the operation history data. With this image forming device, the user can detect whether the operational state has been shifted to a power-saving mode, by accessing the changes in the operational state in the stored operational history data. Such configuration of the operational history data provides the user with the reliability of the image forming device.

Japanese Laid-Open Patent Application No. 9-307672 discloses an image forming device having a communication function. In this image forming device, it is set in a power-saving mode at a suitable timing according to the operation situation and the facsimile receiving situation. A time interval between an end of the image forming operation or an end of the facsimile receiving procedure and a start of automatic power-saving mode setting is controlled based on the operation history data and facsimile receiving history data.

Japanese Laid-Open Patent Application No. 10-173840 discloses an image forming device having a communication function. In this image forming device, a plurality of component units in which the supply/stop of source power to the component units is performed are grouped into a set of blocks. A power-saving unit is provided for each of such blocks. At the time of a start of power supplying, the power-saving unit for a specific block is operated with a time delay, while the power-saving units for other blocks are operated without delay. According to the conventional image forming device, it is possible to control the useless power consumption at the time of the power supplying start.

In recent years, many image forming devices are equipped with the low-power setting function that reduces the power consumption in a standby state low as much as possible. For example, two conceivable methods that attain the energy saving are as follows.

(1) The power source that supplies electric power to the electrical components, such as a fixing heater and a drive motor, is turned off.

(2) The clock signal of the CPU is set at a low speed and a sleep command is issued to the CPU so that the CPU is set in the low-power state. Hereinafter, this state will be called the sleep mode.

However, in the conventional power-saving method, when there is a standby file, such as a time-specified transmission file the transmission time of which is specified, the CPU at that time is not able to be switched to the sleep mode because it must perform the transmission of the file at the specified time. Therefore, the conventional image forming device is capable of changing to the low power state only in the case of the above (1). When there is the standby file, the conventional image forming device has the problem in that the larger the difference between the current time and the start time of transmission specified by the standby file is, the larger the power consumption becomes.

Generally, the following files are stored in a facsimile system as information treated as the standby files.

(1) The time-specified transmission files with which the time of the transmission is specified.

(2) The time-specified polling transmission standby files that are waiting to be transmitted by the polling at the time specified therein.

(3) The retransmission files that are waiting to be retransmitted because of the occurrence of an error or during the conversation.

(4) The charging management reports with which the total of the communication charges is output and transmitted at a fixed time.

Conventionally, when the time-specified transmission files are stored, it has been impossible for the conventional image forming device to switch the operating state of the CPU to the sleep mode because the CPU must perform the transmission of such files at the specified time. Therefore, it is difficult that the conventional image forming device effectively provide power saving when the time-specified transmission files are stored.

SUMMARY OF THE INVENTION

An object of the present invention is to provide an improved image forming apparatus in which the above-described problems are eliminated.

Another object of the present invention is to provide an image forming apparatus having a communication function, which effectively provides power saving by setting the system control unit in a sleep mode even when the time-specified transmission files are stored.

Another object of the present invention is to provide a control method for an image forming device having a communication function, which effectively provides power saving by setting the system control unit in a sleep mode even when the time-specified transmission files are stored.

The above-mentioned objects of the present invention are achieved by an image forming apparatus having a communication unit, comprising: a power supply unit; a system control unit which controls the entire image forming apparatus, the system control unit having a CPU that is set in one of a normal mode, a power-saving mode and a sleep mode by controlling the power supply unit; a real-time clock which keeps track of hours, minutes and seconds of a current time and outputs a signal indicating the current time; a register which stores a return time that indicates a time the CPU is to be switched from one of the power-saving mode and the sleep mode to the normal mode; and a comparator which compares the current time output from the clock with the return time stored in the register, and outputs, when a match occurs, a control signal to the CPU so that the CPU is switched to the normal mode.

The above-mentioned objects of the present invention are achieved by a method of controlling an image forming apparatus having a communication unit, the image forming apparatus including a power supply unit, a system control unit controlling the entire image forming apparatus, the system control unit having a CPU that is set in one of a normal mode, a power-saving mode and a sleep mode by controlling the power supply unit, a real-time clock keeping track of hours, minutes and seconds of a current time and outputting a signal indicating the current time, a register, and a comparator, the method comprising the steps of: setting a return time in the register, the return time indicating a time the CPU is to be switched from one of the power-saving mode and the sleep mode to the normal mode; causing the comparator to compare the current time output from the clock with the return time stored in the register, and to output, when a match occurs, a control signal to the CPU; determining whether an error in the image forming apparatus is detected when an image formation is performed; switching the CPU from the normal mode to the power-saving mode when it is determined that no error is detected; determining whether reduction of power supply to the system control unit by the power supply unit during the power-saving mode is possible; switching the CPU from the power-saving mode to the sleep mode when it is determined that the reduction is possible; and switching the CPU to the normal mode when the comparator outputs the control signal to the CPU.

In the image forming apparatus of the present invention, the comparator outputs, when a match between the current time and the return time occurs, the control signal to the CPU so that the CPU is reset from one of the power-saving mode and the sleep mode to the normal mode, irrespective of whether the time-specified transmission files are stored. It is possible that the image forming apparatus of the present invention reduces the power supply to the system control unit, and set the system control unit in the sleep mode. Therefore, it is possible that the image forming apparatus of the present invention effectively provide power-saving even when the time-specified transmission files are stored.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
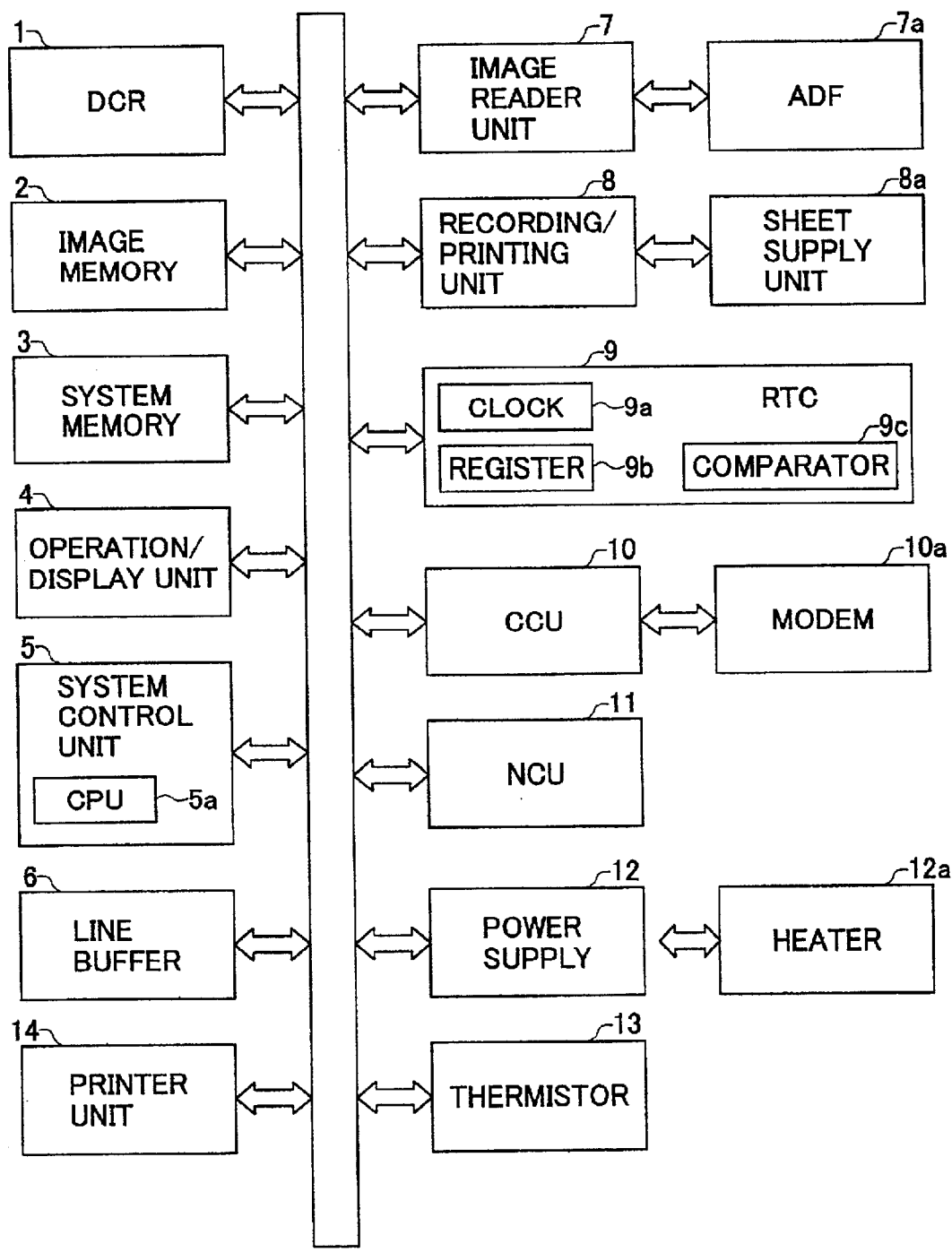
FIG. 1 is a block diagram of a facsimile apparatus to which one embodiment of the image forming apparatus of the present invention is applied.

FIG. 1 shows the configuration of a facsimile system to which one embodiment of the image forming apparatus of the present invention is applied.

As shown in FIG. 1, the facsimile system generally includes an image data compression/decompression unit (DCR) 1, an image memory 2, a system memory 3 that stores system management data, an operation/display unit 4 that has a liquid crystal display panel, an input key pad and so on, a system control unit 5 that has a CPU 5a controls the entire system, and a line buffer 6 that serves as a memory for data transmission. The facsimile system further includes an image reader unit 7 that optically reads an image, an automatic document feeder (ADF) 7a that includes a document width sensor and automatically conveys a document to the image reader unit 7, a recording/printing unit 8 that records image data on a recording sheet by using an electrophotographic printing process, a sheet supply unit 8a which conveys a recording sheet to the recording/printing unit 8, and a real time clock (RTC) 9 that keeps track of hours, minutes and seconds of the current time and makes this data available to the CPU 5a.

The facsimile system further includes a communication control unit (CCU) 10, a modem 10a which has analog-to-digital and digital-to-analog conversion functions and various tone output and detection functions, a network control unit (NCU) 11, a power supply unit 12 that supplies electric power to the electrical components constituting the facsimile system, a heater 12a that is provided in a fixing unit of the recording/printing unit 8, a thermistor 13 that detects a temperature of the fixing unit, and a printer unit 14 that is provided as an optional equipment.

The power supply unit 12 is controlled by the system control unit 5. The power supply locations and the source power voltages are determined based on the power management information stored in the system memory 3. For example, the power supply unit 12 is provided such that the output power voltages of +5V, +24V and -12V are produced from AC 100V, and a heater control signal is supplied to switch ON/OFF the heater 12a, and the fixing unit is heated by the heater 12a such that it is maintained at a fixed temperature.

The system control unit 5 is equipped with a power-mode switching function to set the CPU 5a in one of the normal mode, the power-saving mode, and the sleep mode. The system control unit 5 includes a ROM (read-only memory) and a RAM (random access memory) in addition to the CPU 5a. The power-mode switching function is achieved by using a software (program) stored in the ROM and loaded to the RAM. When the CPU 5a is set in the normal mode, the supply of the output power to the electrical components, including the heater 12a, by the power supply unit 12 is turned ON and the facsimile system is placed in a standby state to perform the printing of the image data. When the CPU 5a is set in the power-saving mode, the supply of the output power to the components, which do not always need to receive the power supply, by the power supply unit 12, is cut off, and the facsimile system is placed in a standby state.

Furthermore, when the CPU 5a is set in the power-saving mode, the supply of the output power to the electrical components, including the heater 12a, by the power supply unit 12 is cut off, or the output power supplied to the electrical components is reduced. On the other hand, when the CPU 5a is set in the sleep mode, the supply of the output power to the CPU 5a by the power supply unit 12 is cut off and only the clock signal from the CPU 5a is actively supplied to the respective components of the facsimile system.

In the image forming apparatus of the present embodiment, the power consumption when the CPU 5a is set in one of the normal mode, the power-saving mode and the sleep mode is predetermined so as to satisfy the conditions that the power consumption in the sleep mode is smaller than that in the power-saving mode, and the power consumption in the power-saving mode is smaller than that in the normal mode.

In the image forming apparatus of the present embodiment, the RTC 9 includes a clock part 9a, a setting register 9b and a comparator 9c. The clock part 9a outputs a signal indicating the current time. The setting register 9b stores a return time indicating a time the CPU 5a is to be switched from one of the power-saving mode and the sleep mode to the normal mode. The comparator 9c compares the current time output from the clock part 9a with the return time output from the register 9b, and outputs, when a match between the current time and the return time occurs, an interrupt signal to the CPU 5a so that the setting of the CPU 5a in one of the power-saving mode and the sleep mode is canceled and the CPU 5a is switched to the normal mode.

The setting of the return time in the register 9b is performed in the following manner. When there is an input of the return time setting command from the operation/display unit 4, the return time is stored in the system memory 3. The system control unit 5 sets the return time, read from the system memory 3, in the register 9b of the RTC 9 when setting the CPU 5a in the sleep mode or the power-saving mode.

The switching control of the system control unit 5 to switch the normal mode to the power-saving mode is caused when one of the following events occurs: (1) there is an input of the power-saving mode setting command from the operation/display unit 4; (2) the duration of time in which the normal mode of the CPU 5a is continuously held exceeds a predetermined time. This predetermined time, which specifies the time the CPU 5a is to be switched from the normal mode to the power-saving mode, is stored in the system memory 3 by inputting a time setting data from the operation/display unit 4. Moreover, the switching control of the system control unit 5 to return or switch the CPU 5a from the power-saving mode to the normal mode is caused when one of the following events occurs: (1) there is an input of the normal mode returning command from the operation/display unit 4; (2) there is a facsimile reception data received from the communication line and stored in the image memory 2; (3) an original document is placed onto the ADF 7a.

The switching control of the system control unit 5 to switch the CPU 5a to the sleep mode after the power supply to the electrical components is turned off is caused when it is determined that no error in the facsimile system is detected by the CPU 5a and that a temperature of the fixing unit in the recording/printing unit 8 of the facsimile system, detected by the thermistor 13, is below a predetermined temperature. The setting of the CPU 5a in the sleep mode is canceled when one of the following events occurs: (1) there is the control signal output from comparator 9c to the CPU 5a; (2) there is an input of the sleep mode cancel command from the operation/display unit 4; (3) there is a facsimile reception data received from the communication line and stored in the image memory 2; (4) an original document is placed onto the ADF 7a. When the CPU 5a is returned to the normal mode, the power supply to the CPU 5a is turned on in the same manner as that of the usually supplied to the CPU 5a.

Figure 2:
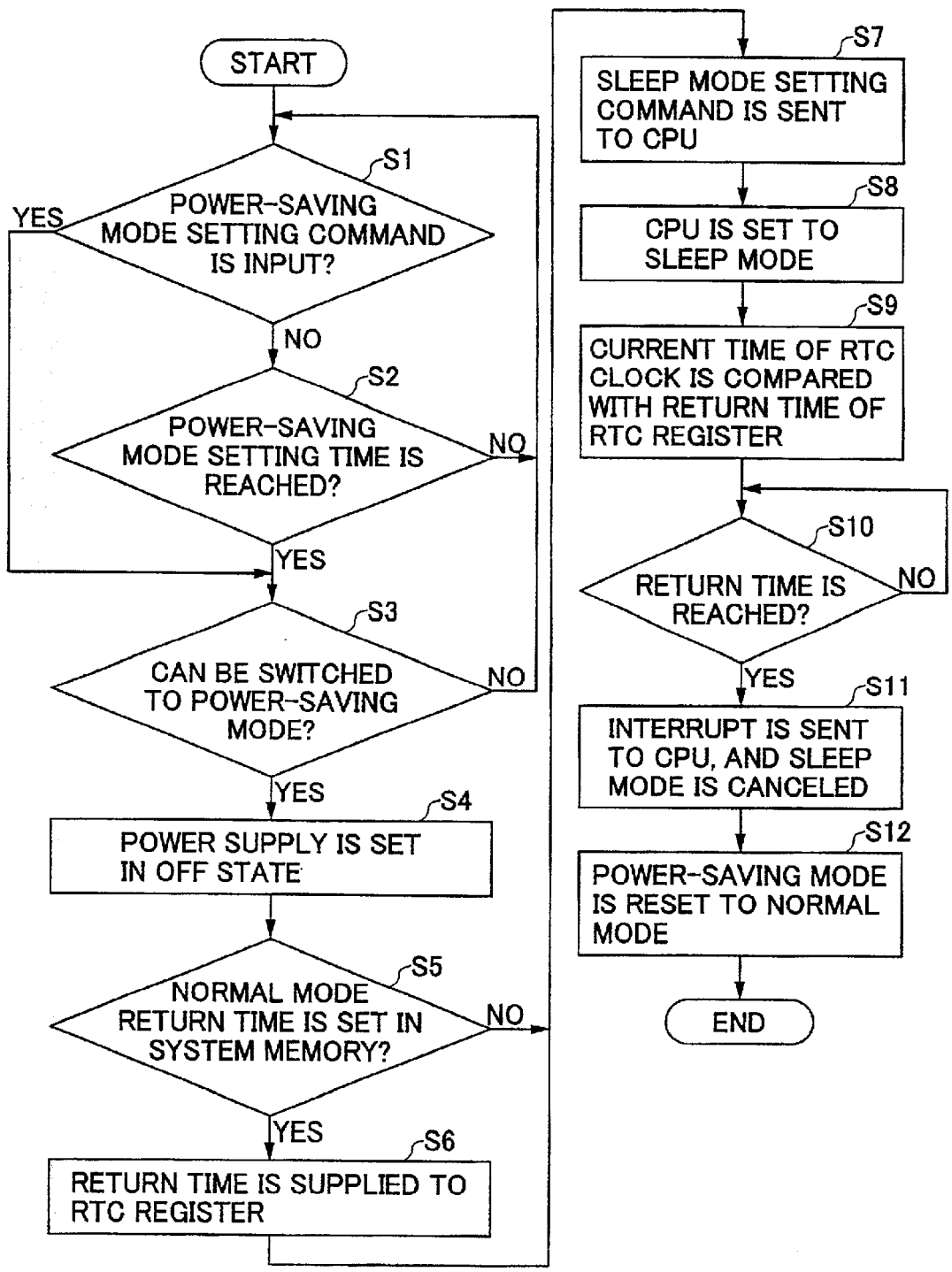
FIG. 2 is a flowchart for explaining a power-mode switching process which is performed by a first preferred embodiment of the image forming apparatus of the present invention.

FIG. 2 shows a power-mode switching process which is performed by a first preferred embodiment of the image forming apparatus of the present invention.

When the image formation is performed by the image forming apparatus, the CPU 5a is switched to the normal mode. The supply of the output power to the electrical components, including the heater 12a of the fixing unit of the recording/printing unit 8, by the power supply unit 12 is turned on, and the fixing unit is heated to an operational temperature so that the image formation is performed by using the recording/printing unit 8. After the image formation is performed, the CPU 5a is usually set in the normal mode.

As shown in FIG. 2, at a start of the power-mode switching process, the system control unit 5 determines whether there is an input of the power-saving mode setting command from the operation/display unit 4 (S1). When the result at the step S1 is affirmative, the control of the system control unit 5 is transferred to the next step S3. When the result at the step S1 is negative, the system control unit 5 determines whether the duration of time in which the normal mode of the CPU 5a is continuously held exceeds the predetermined time (which is called the automatic shift time) (S2). As described above, when the automatic shift time is reached, the CPU 5a is automatically shifted to the power-saving mode. When the result at the step S2 is negative, the control of the system control unit 5 is returned to the step S1. When the result at the step S2 is affirmative, the control of the system control unit 5 is transferred to the next step S3.

In the step S3, the system control unit 5 determines whether no error in the facsimile system is detected by the CPU 5a. Namely, it is checked in the step S3 if the switching control of the system control unit to switch the CPU 5a to the power-saving mode is possible. When the result at the step S3 is negative (an error is detected), it is determined that the switching control is not possible, and the control of the CPU 5a is returned to the above step S1. When the result at the step S3 is affirmative (no error), it is determined that the switching control is possible. In this case, the system control unit 5 controls the power supply unit 12 so that the supply of the output power to the electrical components by the power control unit 12 is cut off (S4). In the step S4, the system control unit 5 switches the CPU 5a from the normal mode to the power-saving mode.

For example, in the facsimile system, it is determined whether there is a facsimile reception data received from the communication line and stored in the image memory 2. When there is no facsimile reception data and no error is detected, the system control unit 5 switches the CPU 5a from the normal mode to the power-saving mode. In the power-saving mode, the supply of the output power +24V to the image reader unit 7 and the recording/printing unit 8 by the power supply unit 8 is cut off. Consequently, it is possible to prevent the power consumption caused by the leaking current in the electrical components.

After the step S4 is performed, the system control unit 5 determines whether the return time, which indicates the time the CPU 5a is to be switched to the normal mode, is set in the system memory 3 (S5). When the result at the step S5 is negative, the control of the system control unit 5 is transferred to the next step S7. When the result at the step S5 is affirmative, the system control unit 5 sets the return time into the register 9b of the RTC 9.

After the step S6 is performed or when the result at the step S5 is negative, the system control unit 5 sends a sleep mode setting command to the CPU 5a (S7). After the step S7 is performed, the system control unit 5 switches the CPU 5a from the power-saving mode to the sleep mode (S8).

In the sleep mode, the system control unit 5 causes the comparator 9c of the RTC 9 to compare the current time output from the clock part 9a with the return time output from the setting register 9b (S9). After the step S9 is performed, the system control unit 5 determines whether there is a match between the current time and the return time, based on the control signal (the interrupt signal) output by the comparator 9c (S10). When the result at the step S10 is negative, the control of the system control unit 5 is returned to the step S10. When a match occurs (the return time is reached), the system control unit 5 cancels the setting of the CPU 5a in the sleep mode in accordance with the control signal output to the CPU 5a (S11). When the setting of the CPU 5a in the sleep mode, the CPU 5a is usually switched to the power-saving mode. After the step S11 is performed, the system control unit 5 switches the CPU 5a from the power-saving mode to the normal mode by performing the switching control (S12).

In a case where the return time is reached after the power supply to the electrical components is turned off and before the CPU 5a is switched to the sleep mode, the interrupt signal output from the comparator 9c is supplied to the CPU 5a. In this case, the CPU 5a is switched to the normal mode. Moreover, when the return time is not set in the system memory 3, the event that the control signal output by the comparator 9c is sent to the CPU 5a does not take place. In such a case, the normal mode setting command is manually inputted by using the operation/display unit 4 in order to switch the CPU 5s to the normal mode.

Next, an operation of the image forming apparatus in the sleep mode will be explained.

Before switching the CPU 5a to the sleep mode and after the power supply to the electrical components by the power supply unit 8 is cut off, the system control unit 5 determines whether there is no error (such as, paper jam or lack of recording sheet) in the image forming apparatus is detected by the CPU 5a. When an error is detected, the system control unit 5 inhibits the setting of the CPU 5a in the sleep mode. In this case, the system control unit 5 sends an error message to the operation/display unit 4 so that the error message is displayed on the display unit 4 in a visible manner.

Furthermore, the system control unit 5 determines whether a temperature of the fixing unit in the recording/printing unit 8, detected by the thermistor 13, is below the predetermined temperature. The system control unit 5 inhibits the setting of the CPU 5a in the sleep mode when it is determined that the detected temperature is not below the predetermined temperature. Only when it is determined that the detected temperature is below the predetermined temperature, the system control unit 5 switches the CPU 5a to the sleep mode. In addition, when the error in the facsimile system is eliminated, the system control unit 5 switches the CPU 5a to the sleep mode based on the detected temperature of the fixing unit.

Moreover, when the facsimile reception is carried out during the sleep mode, the CCU 10 outputs an interrupt signal to the CPU 5a. The setting of the CPU 5a in the sleep mode is canceled in response to the interrupt signal output from the CCU 10. After the setting of the CPU 5a in the sleep mode is canceled, the memory reception is performed and the received image data is stored in the image memory 2. After the memory reception is performed, the CPU 5a is switched to the sleep mode by performing the control procedure of the steps S1 through S12 in FIG. 2.

When a large amount of image data is transmitted to the facsimile system and the image memory 2 stores the image data to the full capacity, the facsimile reception beyond the full capacity of the image memory 2 is impossible. Therefore, when the remaining capacity of the image memory 2 is below a predetermined quantity, the sleep mode is usually switched to the normal mode, and the heater 12a is heated, the printing of all the image data in the image memory 2 is carried out, so that the image memory 2 is changed into an empty state.

Then, when the return time is reached and the CPU 5a usually returns to the normal mode, the printing of the image data stored in the image memory 2 is carried out.

In the above-described embodiment, the setting register 9b is provided inside the RTC 9, and using the clock function of the RTC 9 and the setting time of the register 9b, it is possible that the CPU 5a is set in the sleep mode even when the time-specified transmission files are stored. The switching control of the system control unit 5 to return the CPU 5a to the normal mode from the power-saving mode inclusive of the sleep mode can be performed at the specified time.

Figure 3:
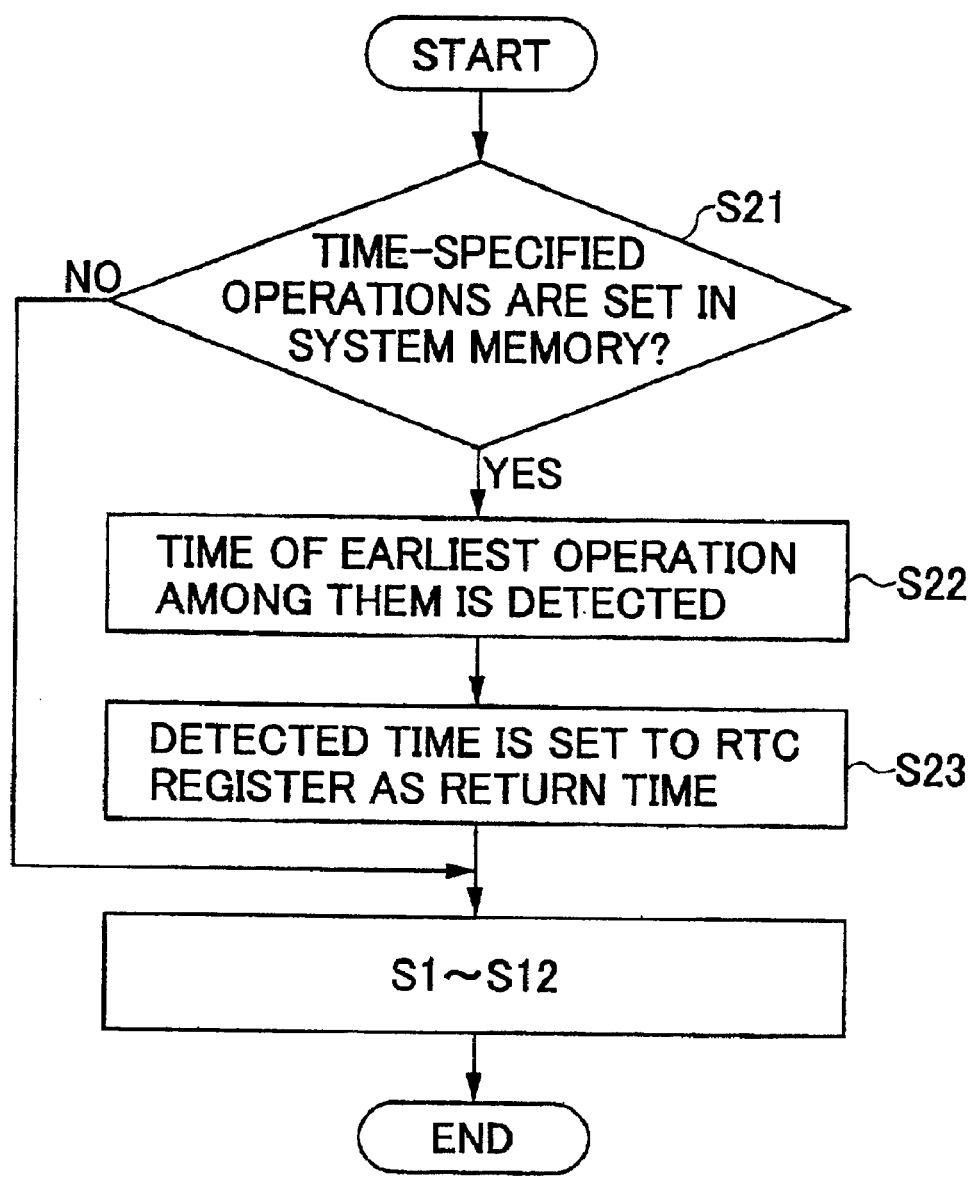
FIG. 3 is a flowchart for explaining a power-mode switching process which is performed by a second preferred embodiment of the image forming apparatus of the present invention.

FIG. 3 shows a power-mode switching process which is performed by a second preferred embodiment of the image forming apparatus of the present invention.

In the second preferred embodiment, it is possible for the image forming apparatus to switch the CPU 5a to the sleep mode before starting time-specified operations related to various kinds of facsimile transmission and reception, in addition to the return function to the normal mode from the power-saving mode at the specified time as in the first preferred embodiment.

Generally, the following files are stored in the facsimile system as information treated as the standby files.

(1) The time-specified transmission files with which the time of the transmission is specified.

(2) The time-specified polling transmission standby files which are waiting to be transmitted by the polling at the time specified therein.

(3) The retransmission files which are waiting to be retransmitted because of the occurrence of an error or during the conversation.

(4) The charging management reports with which the total of the communication charges is output and transmitted at a fixed time.

It is supposed that, when the necessity occurs, the specified time and the specified operations which perform the transmission of the above files are, in advance, inputted into the system memory 3 by using the operation/display unit 4.

As shown in FIG. 3, at a start of the power-mode switching process, the system control unit 5 determines whether the time-specified transmission operations (the standby files) are set in the system memory 3 (S21). When the result at the step S21 is affirmative, the system control unit 5 reads from the system memory 3 the time-specified transmission operation with the earliest transmission time (S22). The system control unit 5 sets the earliest transmission time of the time-specified transmission operation into the setting register 9b of the RTC 9 as the return time (S23).

When the result at the step S21 is negative, the system control unit 5 sets the return time into the setting register 9b. After this operation or the step S23 is performed, the system control unit 5 performs the control procedure of the steps S1 through S12 in FIG. 2 in order to set the CPU 5a in the power-saving mode or the sleep mode, if necessary, and effectively provide power saving of the facsimile system. Then, the power-mode switching process is performed, and the CPU 5a is set to the sleep mode. When the return time is reached, the sleep mode is usually returned to the normal mode.

Next, the time-specified transmission is explained as an example of the power-mode switching process shown in FIG. 3.

By using the operation/display unit 4, the time-specified transmission operation is chosen, and the original document is placed on the ADF 7a. Furthermore, the destination address and the transmission start time are inputted from the operation/display unit 4, and then the start key is pressed. The image of the document on the ADF 7a is optically read by the image reader unit 7, and the image data from the image reader unit 7 is sent to the line buffer 6. The image data sent to the line buffer 6 is compressed by the DCR 1. The compressed image data is stored in the image memory 2 as the standby file. On the other hand, the input destination address, the input transmission start time, and the storage location data of the standby file are set in the system memory 3.

When there is an input of the power-saving mode setting command from the operation/display unit 4, or when the continuation period of the normal mode exceeds a predetermined period, the CPU 5a is switched to the power-saving mode. The power supply to the electrical components by the power supply unit 4 is cut off. The CPU 5a is continuously set in the power-saving mode until the specified time is reached. After the specified time is reached, the CPU 5a is switched from the power-saving mode to the sleep mode. The system control unit 5 reads the transmission start time from the system memory 3 at a fixed interval and compares the read time with the current time of the RTC 9. When a match occurs, the comparator 9c outputs the interrupt signal to the CPU 5a so that the setting of the CPU 5a in the sleep mode is canceled. The CPU 5a is usually returned from the sleep state to the normal mode. The facsimile system is set in the normal mode, and the transmission of the standby file to the destination address is performed at the specified time.

When the time-specified transmission files as shown in the above items (1) through (4) are stored, the power supply to the electrical components by the power supply unit cannot be turned OFF in the conventional image forming device, and the CPU cannot be switched to the sleep mode in such cases. However, in the image forming apparatus of the present embodiment, even when the standby file is stored, the time of the earliest transmission operation is read from the time-specified transmission operations in the system memory 3, and the transmission start time is set to the register 9b of the RTC 9 as the return time before shifting to the sleep mode. When the return time is reached, the returning to the normal mode is also attained.

In addition, the manual operation using the display/operation unit 4 is performed (or in accordance with the elapsed time), and the switching of the CPU 5a to the power-saving mode after the automatic returning function is performed.

Figure 4:
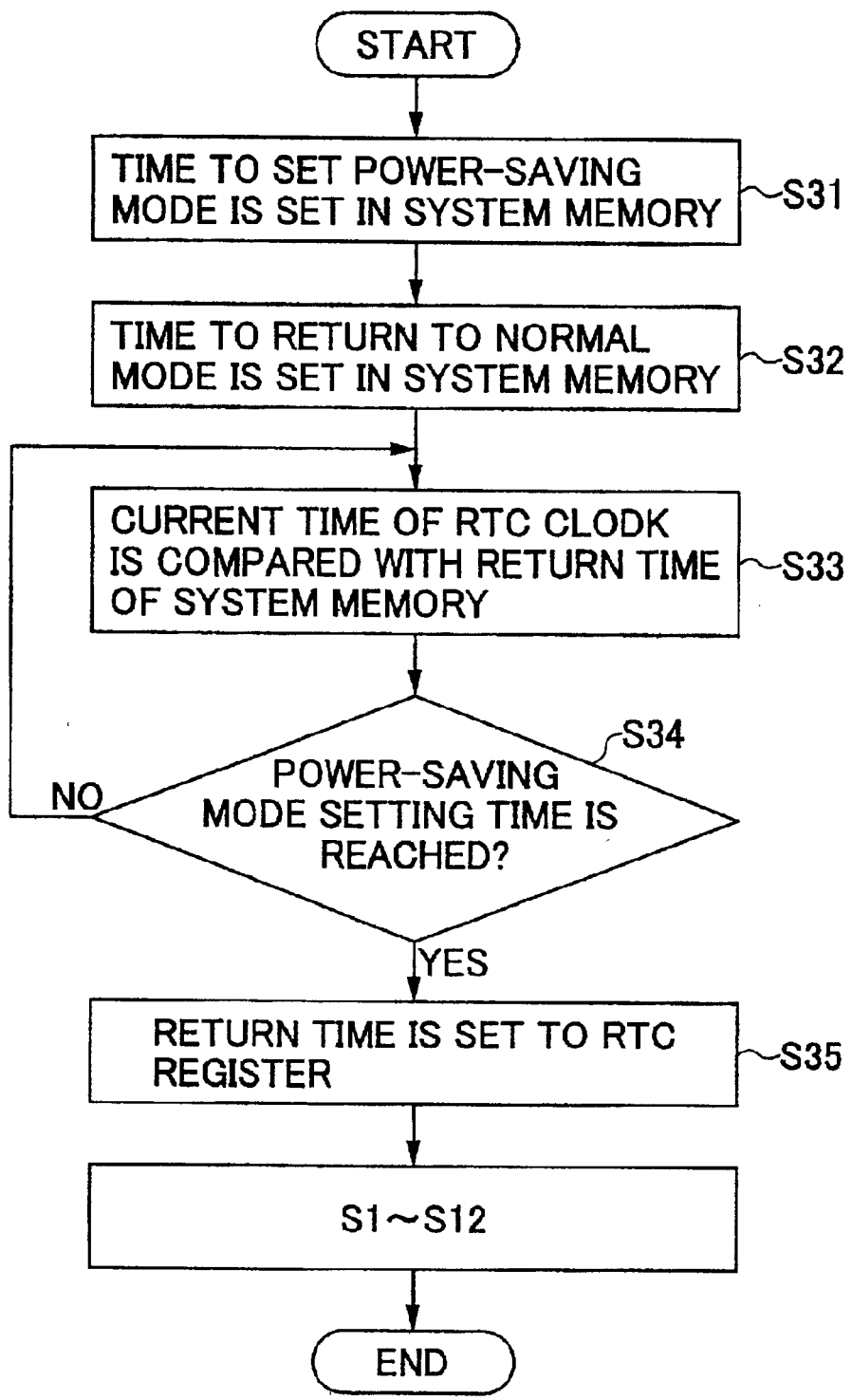
FIG. 4 is a flowchart for explaining a power-mode switching process which is performed by a third preferred embodiment of the image forming apparatus of the present invention.

FIG. 4 shows a power-mode switching process which is performed by a third preferred embodiment of the image forming apparatus of the present invention.

In the present embodiment, the image forming apparatus is equipped with not only the function of the first preferred embodiment to switch the CPU 5a from the normal mode to the power-saving mode, but also the function to automatically switch the CPU 5a from the power-saving mode to the normal mode at the specified time.

Usually, the setting data including the return time and the shift time is inputted from the operation/display unit 4, and the setting data is stored in the system memory 3. A plurality of sets of the shift/return times for one day may be registered. Alternatively, it is possible to register the shift/return time for one week.

A description will be given of the power-mode switching process in the second preferred embodiment with reference to FIG. 4.

As shown in FIG. 4, at a start of the power-mode switching process, the system control unit 5 causes the system memory 3 to store the shift time that is used to switch the CPU 5a from the normal mode to the power-saving mode (S31). The system control unit 5 causes the system memory 3 to store the return time that is used to return the CPU 5a to the normal mode (S32).

After the step S32 is performed, the system control unit 5 compares the current time of the RTC 9 with the shift time stored in the system memory 3 (S33). The system control unit 5 determines whether a match between the current time and the shift time occurs (S34). When the result at the step S34 is affirmative, the control of the system control unit 5 is transferred to the next step S35. Otherwise the step S33 is repeated.

After the shift time is reached (YES of S34), the system control unit 5 sets the registered return time into the setting register 9b of the RTC 9 (S35). After the step S35 is performed, the system control unit 5 performs the control procedure of the steps S1–S12 shown in FIG. 2. Then, the power-mode switching process is performed, and the CPU 5a is set to the sleep mode. When the return time is reached, the setting of the CPU 5a in the sleep mode is canceled and the CPU 5a is usually returned to the normal mode.

Next, the case where one set of the shift time and the return time for one day is registered will now be described. Since the facsimile system is frequently used from 9:00 to 17:00 in the day, the CPU 5a is not switched to the power-saving mode during this period. However, in the night after 17:00 or in the early morning before 9:00, the facsimile system is not frequently used, and during this period, the CPU 5a is switched to the power-saving mode. In the above-mentioned case, the setting data including the return time 9:00 and the shift time 17:00 is registered in the system memory 3.

Next, if the shift time and the return time are registered, the system control unit 5 reads the registered time from the system memory 3 and compares it with the current time from the clock 9a of the RTC 9. When a match between the shift time and the current time occurs, the return time is set to the setting register 9b of the RTC 9, and the output signal of the setting register 9b causes the CPU 5a to be set in the sleep mode. And, when the return time is reached, the setting of the CPU 5a in the sleep mode is canceled and the CPU 5a is returned to the normal mode.

In the third preferred embodiment, the setting data (the return time) to switch the power-saving mode to the normal mode and the setting data (the shift time) to set the CPU 5a in the power-saving mode are registered in the system memory 3. It is possible to perform the power-mode switching process in accordance with the purpose of the use thereof.

Figure 5:
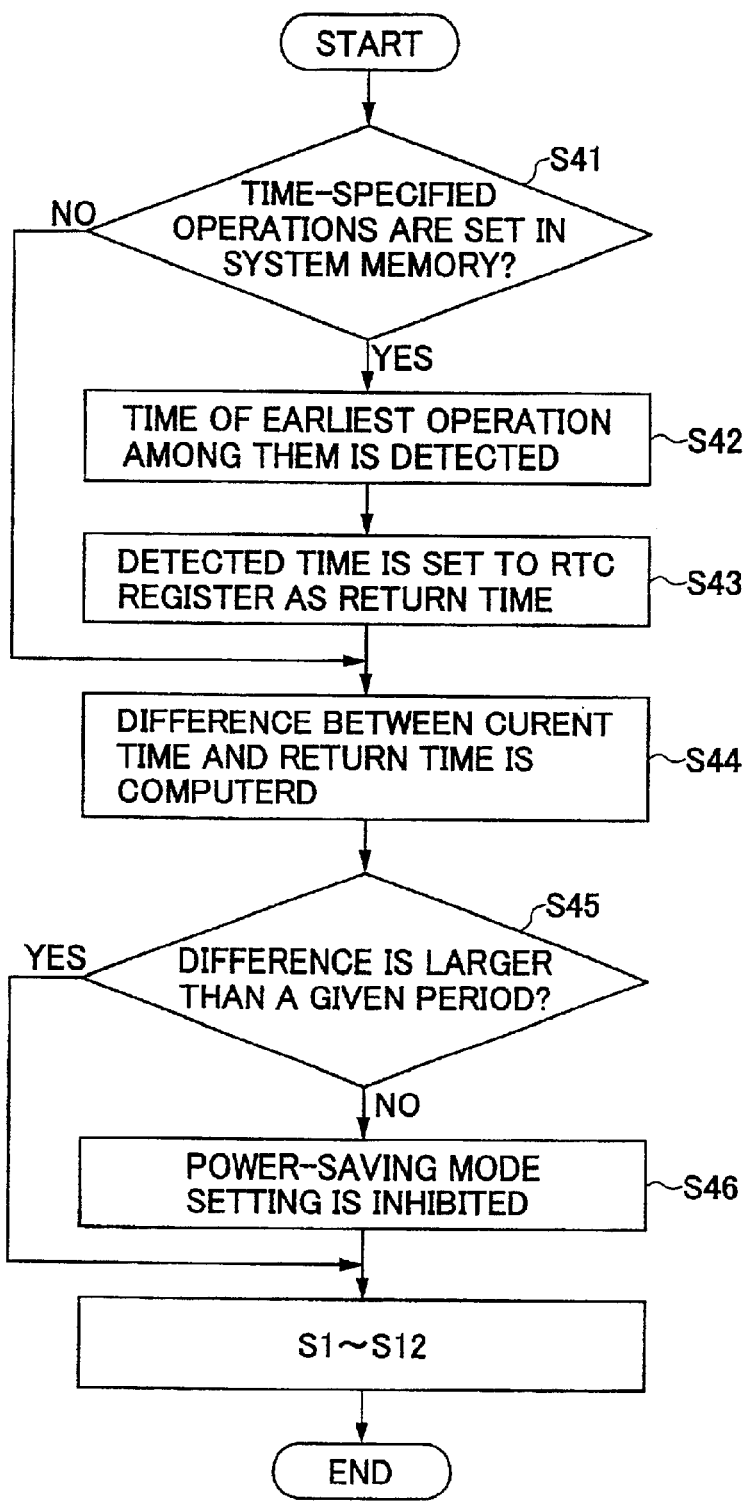
FIG. 5 is a flowchart for explaining a power-mode switching process which is performed by a fourth preferred embodiment of the image forming apparatus of the present invention.

FIG. 5 shows a power-mode switching process which is performed by a fourth preferred embodiment of the image forming apparatus of the present invention.

In the second preferred embodiment, when there are the standby files, the execution start time of each file is set up as the return time from the power-saving mode to the normal mode. However, the switching between the power-saving mode and the normal mode may be repeated for a short time. For example, when a broadcasting transmission file having ten destination locations is stored as the standby file in the facsimile system, the transmission to the second destination is started about 12 seconds after the end of the transmission to the first destination. Namely, when the transmission of the file to the first destination is complete, the CPU 5*a* is switched to the power-saving mode. After 12 seconds from that timing, the CPU 5*a* is returned from the power-saving mode to the normal mode, and the transmission of the same file to the second destination is performed.

In this case, the relay switching sound may frequently occur when the supply of the output power to the electrical components by the power supply unit 12 is turned off. Moreover, when the setting of the power-saving mode is just performed at the return time, the automatic return function may not be properly performed.

The power-mode switching process of the fourth preferred embodiment is provided in order to eliminate the above-mentioned problem. In the present embodiment, the normal mode is kept without being switched to the power-saving mode, when a time interval between the current time and the return time is smaller than a predetermined interval.

As shown in FIG. 5, the system control unit 5 determines whether time-specified transmission operations are stored in the system memory 3 (S41). When the result at the step S41 is affirmative, the system control unit 5 reads from the system memory 3 the time-specified transmission operation with the earliest transmission time (S42). The system control unit 5 sets the earliest transmission time of the time-specified transmission operation into the setting register 9*b* of the RTC 9 as the return time (S43).

When the result at the step S41 is negative, the system control unit 5 sets the return time into the setting register 9*b*. After this operation or the step S43 is performed, the system control unit 5 calculates a difference between the current time of the clock 9*a* and the return time of the setting register 9*b* (S44). After the step S44 is performed, the system control unit 5 determines whether the calculated time difference is larger than a given period (S45).

When the result at the step S45 is affirmative, the system control unit 5 performs the control procedure of the steps S1 through S12 in FIG. 2 in order to set the CPU 5*a* in the power-saving mode or the sleep mode, if necessary, and effectively provide power saving of the facsimile system. On the other hand, when the result at the step S45 is negative, the system control unit 5 inhibits the setting of the CPU 5*a* in the power-saving mode (S46). After the step S46 is performed, the system control unit 5 performs the control procedure of the steps S1 through S12 in FIG. 2. Then, the power-mode switching process is performed, and the CPU 5*a* is set to the sleep mode. When the return time is reached, the sleep mode is usually returned to the normal mode.

Accordingly, in the present embodiment, the normal mode is kept without being switched to the power-saving mode, when the time difference between the current time and the return time is smaller than the given period. It is possible to eliminate the problems, such as the frequent occurrence of the relay switching sound or the improper performance of the automatic return function, which may arise if the switching between the normal mode and the power-saving mode is performed for a short time.

In the above-described embodiments, when the return time is reached after the CPU 5*a* is set in the power-saving mode or the sleep mode, the CPU 5*a* is returned to the normal mode. At this time, the supply of the output power to the heater 12*a* by the power supply unit 12 is turned ON as soon as the CPU 5*a* is set in the normal mode.

Therefore, when the memory reception occurs, or when performing the facsimile reception according to the return time, the printing of the image data onto paper can be immediately started. However, in the case of the facsimile system, the starting of the printing at the return time when the CPU 5*s* is returned to the normal mode is not required because the memory reception does not always occur, and depending on the use environment there is the case where it is unnecessary to immediately perform the printing of the image data.

By taking the above-mentioned matter into consideration, the normal mode returning function in the above embodiments may be modified in such a manner that, when the setting of the CPU 5*a* in the sleep mode is canceled, the CPU 5*a* is returned to the power-saving mode, rather than to the normal mode. By storing both the original setting data to perform the normal mode returning function and the modified setting data to attain the modified function into the system memory 3, the operation may select one of the original setting data and the modified setting data in order to perform the selected function according to the user demands of the image forming apparatus.

In the image forming apparatus of the above-described embodiment, the power consumption when the CPU 5*a* is set in one of the normal mode, the power-saving mode and the sleep mode is predetermined so as to satisfy the conditions that the power consumption in the sleep mode is smaller than that in the power-saving mode, and the power consumption in the power-saving mode is smaller than that in the normal mode (normal mode> power-saving mode> sleep mode).

By configuring the image forming apparatus in the above-mentioned manner, the setting of the CPU 5*a* in the sleep mode may be determined based on the setting data of the system memory 3. For example, the sleep mode of the CPU 5*a* is canceled when the input of the sleep mode cancel command from the operation/display unit 4 occurs, or when the reception of image data from the communication line occurs, or when the output signal from the comparator 9*c* of the RTC 9 occurs. Moreover, when the setting of the CPU 5*a* in the sleep mode is canceled, the control operation to return the CPU 5*a* to either the power-saving mode or the normal mode may be performed based on the setting data of the system memory 3.

Moreover, the modification may be made such that the presence of the received image data in the image memory 2 is detected, and one of the original setting data and the modified setting data in the system memory 3 is selected as the result of the detection of the image data in the image memory 2. When there is the image data in the image memory 2, the CPU 5*a* is switched to the normal mode and the printing of the image data on paper is performed. When there is no image data in the image memory 2, the supply of the output power to the heater 12*a* by the power supply unit 12 is turned off, and the sleep mode of the CPU 5*a* is returned to the power-saving mode.

Furthermore, when the return time is reached, the normal mode returning function is performed in each of the above-described embodiments. For this reason, in order to heat the fixing unit by the heater 12*a* and set the facsimile system in the standby state to perform the printing of the image data, the time the facsimile system is set in the standby state becomes later than the specified return time. It is possible to make the specified return time that is set in the setting register 9*b* slightly smaller than the time as originally specified, such that the time the facsimile system is set in the standby state is in conformity with the return time.

Moreover, in the above-described embodiments, the present invention is applied to the facsimile system as an example. However, the present invention is applicable also to a multi-function machine which has various image forming functions including the copying, the printing and the facsimile functions. When the present invention is applied to the multi-function machine, the conditions of the multi-function machine in which it is returned to the usual mode after the return time is reached should be determined in detail depending on which function of the various image forming functions is mainly used.

The multi-function machine is equipped with function selecting keys. It is possible to configure the multi-function machine such that, when one of these keys is pressed, the operator is automatically requested to change the contents of the system memory 3 in accordance with the desired setting data. For example, when the copying function selecting key is pressed, the contents of the system memory 3 are changed so that the temperature of the fixing unit is raised to a high temperature at which the printing of the image data is possible after the power-saving mode is switched to the normal mode. When the printing function selecting key is pressed, the contents of the system memory 3 are changed so that the fixing unit is set in a preheating state and the temperature of the fixing unit is set at a temperature lower than the high temperature at which the printing of the image data is possible after the power-saving mode is switched to the normal mode. When the facsimile function selecting key is pressed, the contents of the system memory 3 are changed so that the power supply to the heater of the fixing unit is cut off after the power-saving mode is switched to the normal mode. Further, it is possible that the contents of the system memory 3 may be changed when the input setting data from the operation/display unit 4 occurs, such that they are suited to the use environment of the image forming apparatus.

The present invention is not limited to the above-described embodiments, and variations and modifications may be made without departing from the scope of the present invention. For example, although the image data with which the facsimile reception is performed through the communication line is recorded in the above-described embodiments, the image data that is received by using the e-mail function may be recorded by the image forming apparatus. Furthermore, the image data may be input from an external terminal to the image forming apparatus by using the communication line or via a local area network (LAN).

Further, the present invention is based on Japanese priority application No. 2001-95063, filed on Mar. 29, 2001, the entire contents of which are hereby incorporated by reference.

What is claimed is:

1. An image forming apparatus having a communication unit, comprising:
   a power supply unit;
   a system control unit controlling the entire image forming apparatus, the system control unit having a CPU that is set in one of a normal mode, a power-saving mode and a sleep mode by controlling the power supply unit;
   a real-time clock keeping track of hours, minutes and seconds of a current time and outputting a signal indicating the current time;
   a register storing a return time that indicates a time the CPU is to be switched from one of the power-saving mode and the sleep mode to the normal mode;
   a comparator comparing the current time output from the clock with the return time stored in the register, and outputting, when a match occurs, a control signal to the CPU so that the CPU is switched to the normal mode; and
   a system memory which stores at least one time-specified transmission operation data,
   wherein, when it is determined that the time-specified transmission operation data is stored in the system memory, the system control unit reads a time-specified transmission operation with an earliest transmission time from the system memory, and sets the earliest transmission time into the register as the return time.

2. The image forming apparatus according to claim 1, wherein, when the CPU is set in the sleep mode in which a power consumption in the sleep mode is made to be smaller than a power consumption in the power-saving mode, the system control unit cancels the setting of the CPU in the sleep mode based on the control signal output by the comparator when the match occurs.

3. The image forming apparatus according to claim 2, wherein, when an error in the image forming apparatus is detected before switching the CPU from the normal mode to the power-saving mode, the system control unit inhibits the setting of the CPU in the power-saving mode.

4. The image forming apparatus according to claim 2, wherein, after the CPU is set in the power-saving mode, the system control unit sets the return time into the register immediately before setting the CPU in the sleep mode.

5. The image forming apparatus according to claim 4, wherein, after the CPU is set in the power-saving mode, the system control unit sets the CPU in the sleep mode when a temperature of an internal component of the image forming apparatus is below a predetermined temperature.

6. The image forming apparatus according to claim 2, further comprising a printing unit which prints image data on paper by using an electro-photographic printing process,
   wherein, when the CPU is set in the power-saving mode, the system control unit switches the CPU from the power-saving mode to the sleep mode when it is determined that reduction of power supply to the system control unit by the power supply unit is possible.

7. The image forming apparatus according to claim 6, further comprising an image memory which stores image data, wherein the system control unit performs a facsimile reception by using the image memory,
   wherein, when the CPU is set in the sleep mode and it is determined that the facsimile reception is stored in the image memory, the system control unit returns the CPU to the normal mode, and when the CPU is set in the sleep mode and it is determined that the facsimile reception is not stored in the image memory, the system control unit returns the CPU to the power-saving mode.

8. The image forming apparatus according to claim 1, further comprising a printing unit which prints image data on paper by using an electro-photographic printing process,
   wherein the system control unit inhibits the power supply unit from supplying power to the printing unit when the CPU is switched from the normal mode to the power-saving mode.

9. The image forming apparatus according to claim 1, further comprising an image memory which stores image data,
   wherein the system control unit performs a facsimile reception by using the image memory.

10. The image forming apparatus according to claim 9, further comprising a printing unit which prints image data on paper, wherein, when the CPU is set in the power-saving mode and an amount of the image data stored in the image memory exceeds a predetermined amount, the system control unit switches the CPU from the power-saving mode to the normal mode and causes the printing unit to print the image data, read from the image memory, on paper so that the amount of the image data stored in the image memory is reduced.

11. The image forming apparatus according to claim 1, wherein the system control unit comprises a calculating unit calculating a difference between the current time of the clock and the return time of the register, and wherein the system control unit inhibits the setting of the CPU in the power-saving mode when it is determined that the time difference calculated by the calculating unit is not larger than a given period.

12. The image forming apparatus according to claim 1, wherein the system control unit sets into the register a second return time having a value smaller than a value of the return time originally specified, so that the CPU is switched to the normal mode completely when the originally specified return time is reached.

13. An image forming apparatus having a communication unit comprising:
   a power supply unit;
   a system control unit controlling the entire image forming apparatus, the system control unit having a CPU that is set in one of a normal mode, a power-saving mode and a sleep mode by controlling the power supply unit;
   a real-time clock keeping track of hours, minutes and seconds of a current time and outputting'a signal indicating the current time;
   a register storing a return time that indicates a time the CPU is to be switched from one of the power-saving mode and the sleep mode to the normal mode;
   a comparator comparing the current time output from the clock with the return time stored in the register, and outputting, when a match occurs, a control signal to the CPU so that the CPU is switched to the normal mode; and
   a system memory which stores system management data,
   wherein the system control unit stores in the system memory a shift time that indicates a time the CPU is to be switched from the normal mode to the power-saving mode, the system control unit storing in the system memory the return time that indicates the time the CPU is to be switched to the normal mode, and the system control unit switching the CPU to the power-saving mode when the shift time is reached, and switching the CPU to the normal mode by causing the register to output the control signal to the CPU when the return time is reached.

14. A method of controlling an image forming apparatus having a communication unit, the image forming apparatus including a power supply unit, a system memory, a system control unit controlling the entire image forming apparatus, the system control unit having a CPU that is set in one of a normal mode, a power-saving mode and a sleep mode by controlling the power supply unit, a real-time clock keeping track of hours, minutes and seconds of a current time and outputting a signal indicating the current time, a register, and a comparator, the method comprising the steps of:
   setting a return time in the register, the return time indicating a time the CPU is to be switched from one of the power-saving mode and the sleep mode to the normal mode;
   causing the comparator to compare the current time output from the clock with the return time stored in the register, and to output, when a match occurs, a control signal to the CPU;
   determining whether an error in the image forming apparatus is detected when an image formation is performed;
   switching the CPU from the normal mode to the power-saving mode when it is determined that no error is detected;
   determining whether reduction of power supply to the system control unit by the power supply unit during the power-saving mode is possible;
   switching the CPU from the power-saving mode to the sleep mode when it is determined that the reduction is possible;
   switching the CPU to the normal mode when the comparator outputs the control signal to the CPU;
   reading a time-specified transmission operation with an earliest transmission time from the system memory; and
   setting the return time in the register as the earliest transmission time.

15. A method of controlling an image forming apparatus having a communication unit, the image forming apparatus including a power supply unit, a system memory, a system control unit controlling the entire image forming apparatus, the system control unit having a CPU that is set in one of a normal mode, a power-saving mode and a sleep mode by controlling the power supply unit, a real-time clock keeping track of hours, minutes and seconds of a current time and outputting a signal indicating the current time, a register, and a comparater, the method comprising the steps of:
   setting a return time in the register, the return time indicating a time the CPU is to be switched from one of the power-saving mode and the sleep mode to the normal mode;
   causing the comparator to compare the current time output from the clock with the return time stored in the register, and to output, when a match occurs, a control signal to the CPU;
   determining whether an error in the image forming apparatus is detected when an image formation is performed;
   switching the CPU from the normal mode to the power-saving mode when it is determined that no error is detected;
   determining whether reduction of power supply to the system control unit by the power supply unit during the power-saving mode is possible;
   switching the CPU from the power-saving mode to the sleep mode it is determined that the reduction is possible;
   switching the CPU to the normal mode when the comparator outputs the control signal to the CPU;
   storing in the system memory a shift time that indicates a time the CPU is to be switched from the normal the mode to the power-saving mode; and
   switching the CPU to the power-saving mode when the shift time is reached, and switching the CPU to the normal mode by causing the register to output the control signal to the CPU when the return time is reached.

* * * * *